Oct. 22, 1957   O. B. REYNOLDS   2,810,143
PARAFFIN SCRAPER
Filed June 24, 1954
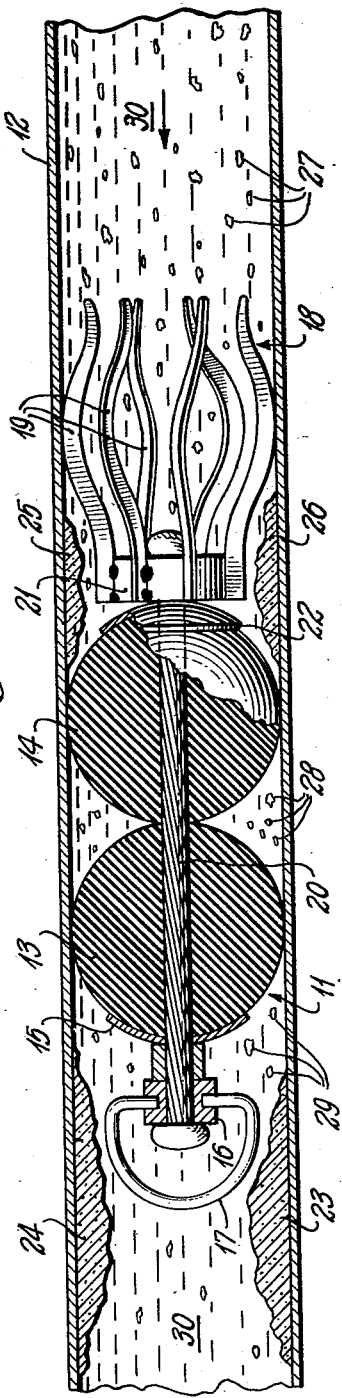
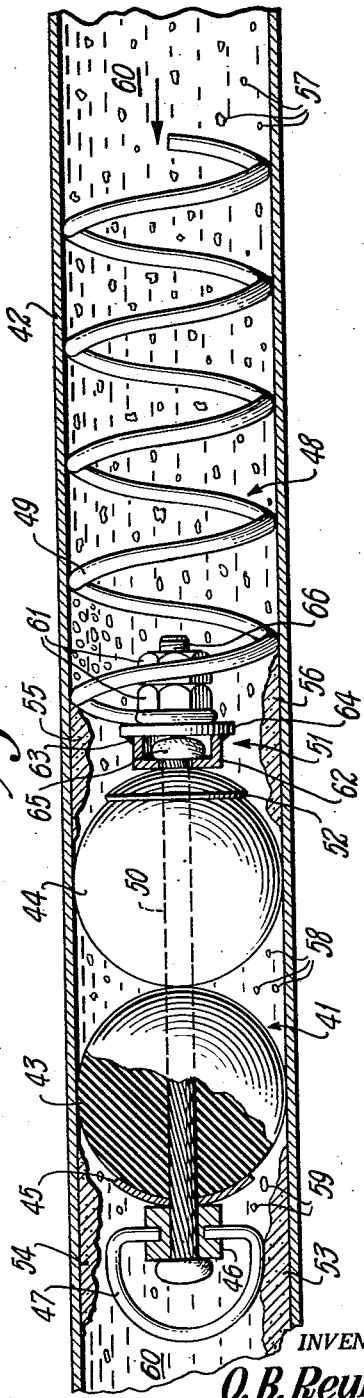
INVENTOR.
O. B. Reynolds
BY Hudson & Young
ATTORNEYS United States Patent Office 2,810,143
Patented Oct. 22, 1957

2,810,143

PARAFFIN SCRAPER

Orvel B. Reynolds, Bartlesville, Okla., assignor to Phillips Petroleum Company, a corporation of Delaware Application June 24, 1954, Serial No. 438,901

2 Claims. (Cl. 15—104.06)

This invention relates to cleaners for pipe lines. In one aspect it relates to scrapers for removing paraffin wax and other solid and semi-solid material from pipe lines. In another aspect it relates to scrapers propelled by flowing liquid in pipe lines for removing paraffin and other solid and semi-solid matter from the lines.

Crude oils frequently deposit paraffin wax on the walls of oil well flow lines, lead lines, and gathering lines. In many instances such lines are of comparatively small diameter with sharp bends and often are subject to troublesome deposits of paraffin. It is not uncommon for such crude oil carrying pipes of small diameter, for example, two inches inside diameter, to become plugged completely.

Tools for scraping accumulation of scale, paraffin, etc., have been known and used for many years. A great many types and variations of such tools have been used. However, to my knowledge a tool has not previously been constructed which is completely satisfactory for scraping paraffin accumulations from the inside of such oil well lines as those mentioned above. Previous scrapers have caused difficulty due to becoming stuck in the lines. This sticking has even occurred in sections of straight pipe where the scraped paraffin has accumulated in the scraper elements or ahead of the driving elements and also where the scraping tool was unable to traverse a bend. I have now devised a solid material scraping tool which effectively cleans the accumulation of paraffin and other solid and semi-solid material from the inside of such lines without becoming stuck in the lines.

An object of my invention is to provide a scraper for removal of accumulated scale, paraffin wax and other solid and semi-solid material from the inner walls of pipe lines.

Another object of my invention is to provide a scraper for removal of accumulated scale, paraffin wax and other solid and semi-solid material from the inner walls of pipe lines, which scraper is propelled by flowing liquid.

Still another object of my invention is to provide such a scraper which will pass through bent and partially collapsed sections as well as circular sections of pipe.

Yet another object of my invention is to provide such a scraper which will pass around sharp bends, such as right angle bends, in a pipe line.

Still other objects and advantages of my invention will be realized by those skilled in the art upon reading the accompanying description, which with the attached drawing forms a part of this disclosure.

I accomplish these and other objects by providing a solid and semi-solid scraper assembly for use in pipe lines comprising, in combination, at least one spherical flexible ball having a diameter approximately equal to the inner diameter of the pipe line to be scraped of said material and said ball being of such diameter with regards to the inner diameter of said pipeline that said ball is propelled in said pipe line by flowing liquid, a pull ring attached to said ball, a scraper element attached to said ball on the side opposite said pull ring and said scraper element being adapted to follow said ball in said pipe line.

I further provide a scraper assembly for removing solid and semi-solid material from the inner surface of pipe lines comprising, in combination, a pair of flexible balls having a diameter approximately equal to the inner diameter of the pipe line to be scraped of said material and said balls being of such diameter with respect to the inner diameter of said pipe line that the balls are propelled in said pipe line by flowing liquid, a pull ring attached to one of said balls, said one ball being attached on its side opposite said pull ring to the other ball, the latter of said balls being attached on its side opposite the attachment to said one ball to a scraper element and said scraper element being adapted to follow said balls in said pipe line.

In the drawing Figure 1 represents diagrammatically and partly in section one form of apparatus of my invention.

Figure 2 represents diagrammatically and partly in section another embodiment of my invention.

In Figure 1 of the drawing reference numeral 11 refers to one modification of my scraper assembly disposed in a pipe 12. In this modification two rubber balls 13 and 14 are disposed on a flexible shaft 20. This flexible shaft is under some conditions a flexible steel cable. A suitable flexible tube can, if desired and under some conditions, be used in place of the flexible steel cable. A spherical cup shaped washer 15 is mounted on the flexible shaft 20 as shown and in front of the leading rubber ball 13. A head 16 is attached to the leading end of the flexible shaft and preferably adjacent the washer 15. This head 16 can be attached to the flexible shaft by welding, clamping or by any other suitable means providing it is tightly and permanently attached to the shaft. Attached to the head 16, as illustrated, is a pull ring 17. This pull ring 17 assists in removal of the assembly manually from a pipe. On the end of the flexible shaft 20 opposite the pull ring is a scraper assembly 18. This assembly includes a collar 21 which is permanently attached to the flexible shaft 20. The collar can be attached to the shaft in the same manner as head 16. A plurality of scraper fingers 19 are permanently attached to the collar 21. These flexible fingers 19 are the scraper fingers which when moved along the pipe scrape loose adhering deposits. These scraper fingers are preferably made from, for example, spring steel or other spring or flexibl material. A flexible or spring metal is desired for these fingers because the fingers are preferably attached to the collar in such a manner that when the assembly is inserted into a pipe the fingers are squeezed together. This method of attaching the fingers to the collar causes the fingers to bear tightly against the wall as the assembly is moved along in a pipe line. In this manner the fingers scrape against the wall of the pipe and remove adhering deposits. A cup washer 22 similar to washer 15 is placed on shaft 20 intermediate collar 21 and ball 14. This washer 22 serves the purpose of preventing the ball 14 from being forced or pulled off the rear end of the assembly. The leading cup shaped washer 15 serves a similar purpose under conditions when the assembly is pulled backwards and when the balls pull the assembly.

Reference numerals 23, 24, 25 and 26 are intended to identify deposits of paraffin wax or other solid and semi-solid material in the pipe. Reference numerals 27, 28 and 29 identify flakes of paraffin wax and other solid and semi-solid material which have been scraped loose. Reference numerals 30 identify, for example, crude oil in the pipe line in which flakes of solid material 27, 28 and 29 are suspended.

In Figure 2 the leading part of the scraper assembly 41 is constructed in a manner more or less similar to that illustrated in Figure 1. A pair of rubber balls 43 and 44 are positioned on a flexible shaft 50 with spherical or cupped washers 45 and 52 positioned as shown. A head 46 is affixed to the front end of the shaft 50 in any suitable manner and is provided with a pull ring 47. At the rear end of the shaft 50 is attached a scraper assembly 48. This scraper assembly is held to a collar assembly 51 by lock nuts 61 or by other suitable means as desired. This assembly 51, as illustrated in the drawing, is composed of a cupped washer 62 joined to the head 64 of a bolt 66 by welds 63. In the cupped washer 62 is a head 65 on the rear end of flexible shaft 50.

The scraper in this embodiment of my invention is a helical spring 49. This spring is so selected that its outer diameter is about the same or slightly larger than the inner diameter of the pipe in which it is to be used. When this spring has an outer diameter slightly larger than that of the pipe the spring definitely and positively bears against and scrapes the inner wall of the pipe as the assembly is moved therein. In Figure 2 the scraper assembly is illustrated as being within a pipe 42. Paraffin or other material deposits 53, 54, 55 and 56 are shown adhering to the walls of the pipe. Flakes of wax or other solid material 57, 58 and 59 are illustrated as being suspended in liquid 60 in the pipe.

Balls 13 and 14 in Figure 1 and balls 43 and 44 of Figure 2 have been hereinbefore described as being rubber balls. In case the scraper assembly of my invention is used for cleaning pipes in the presence of water or other liquid which has no softening or solvent action on rubber the balls can be ordinary or natural rubber. In case the cleaners are to be used in cleaning paraffin from crude oil lines the balls should preferably be made of a synthetic elastomer which is inert to chemical or solvent action of the oil.

As mentioned hereinbefore the pull ring end of my scraper assembly is intended to be the leading end of the apparatus.

My cleaning apparatus is particularly useful for cleaning deposits from pipes in which there are dents or partially collapsed sections and for traversing bends. When the cleaner enters a partially collapsed section of pipe the rubber or synthetic elastomer balls are distorted in shape to fit the inner section of the pipe and when the balls pass from a distorted section they return to their original spherical shapes.

The cleaners are powered or propelled through pipe lines under the influence of flowing liquid. It is intended that, as for example in Figure 1, the liquid in the pipe flows in the direction indicated by the arrow and liquid pressure exerted in this direction causes ball 14 to move the assembly in the pipe line. When the fluid pressure from the power liquid is exerted against the following half of ball 14, the ball tends to be compressed, at least slightly, which compression tends to lengthen the diameter of the ball and the ball is then pressed all the tighter against the walls of the pipe. Any leakage of liquid around the edge of ball 14 causes pressure to be exerted against the following half of ball 13 and it assists exerting a pulling force on the assembly.

While in both embodiments of my invention I have illustrated my cleaner assembly with two rubber balls, the apparatus can, under some conditions, be assembled with only one rubber ball or more than two and used in many applications. However, if a sharp bend, for example a short radius right angle bend, is to be cleaned it is preferable to use at least two rubber balls in the cleaner. When the cleaning apparatus starts around a right angle bend the leading ball of the assembly may under some conditions fail to touch the inner wall of the pipe at one or more points and in this manner the ball would tend to lose its driving force. In this case the following ball which is still in the straight section of pipe just prior to the bend exerts its driving force to push the leading ball around the bend. By the time the following ball reaches the actual bend the leading ball is beyond the bend and in a straight section of the pipe and in case the following ball then fails to provide driving force the leading ball serves to pull the following ball around the bend. As soon as the following ball enters the straight section of pipe it also exerts drawing force to the cleaner assembly. A somewhat similar situation exists when the scraper passes through valves which have a cross section larger than the pipe. The distance between centers of the first and last balls is greater than the length of any enlarged section of pipe. The scraper fingers 19 of Figure 1 are relatively short and are therefore adapted to traverse a bend without becoming lodged therein.

In the embodiment of Figure 2, the scraper element 49 is easily adapted to traverse bends because the helix is flexible and bends easily. In addition to cooperating with the fluid in transit for propelling the apparatus within a pipe the rubber balls serve the additional purpose of removing wax from the pipe walls. However, under some conditions when the wax is adhering tightly against the pipe walls the balls may merely press the wax against the walls. In this case when the balls of the assembly pass the deposits of wax the scraper fingers or the helical spring comes along and scrapes the wax from the walls.

In operation, the scraper is inserted in a pipe through a suitable opening, the opening closed and a pressure applied behind the scraper unit to force it through the line. The resilient spherical balls easily conform to the inside diameter of the pipe which may be irregular due to paraffin accumulations and/or contain dents or out-of-round sections, thus maintaining a pressure differential which drives the unit through the pipe. However, if accumulation of paraffin ahead of the unit occurs, an increase in the pressure may force a part of the driving fluid around the rear ball, thus washing the accumulations ahead of the scraper assembly. By placing the balls ahead of the scraping element such accumulations ahead of the balls are reduced to a minimum. Two balls are preferred, at least under some conditions, to prevent excessive loss of driving fluid around the unit when it encounters an enlarged section such as a gate valve, and to assist in traversing bends. One of the balls is in the body of the pipe at all times thus assuring that the unit will continue to move through the pipe.

The flexible metal fingers of the embodiment of Figure 1 readily conform to the cross section of the interior of the pipe because they are made of spring metal. The helical spring of the apparatus of Figure 2 also readily conforms to irregularities in the pipe. The helical spring scraper is particularly useful as a scraper because when it is traversing a pipe section of smaller than normal diameter it scrapes all the harder on the pipe walls and at the small diameter point the diameter of the helix is actually reduced with the result that the helix is elongated thereby increasing its scraping action. This temporary diminution of the diameter of the helical spring results when the spring is pulled through a small diameter section of pipe and also when accumulation on the pipe walls are too hard to be removed.

While certain embodiments of the invention have been described for illustrative purposes the invention obviously is not limited thereto.

I claim:

1. A scraper assembly for removing solid and semi-solid material from the inner surface of pipelines comprising, in combination, a pair of flexible balls fitting said pipeline to be scraped of said material, said balls having approximately the same diameter as said pipeline and being adapted to be propelled in said pipeline by flowing fluid, a tubular opening extending through each ball, a flexible shaft disposed through the tubular openings in such a manner as to position said balls on said shaft, said balls also touching each other, the ends of said shaft extending beyond opposite ends of the tubular openings in said balls, a first means at one end of said shaft holding said balls from sliding off said one end, second means at the other end of said shaft holding said balls from sliding off said other end, a helical spring supported by said first means, said spring having about the same diameter as said pipeline whereby on being pulled through said pipeline as said balls are propelled by fluid passing therethrough said spring scrapes said material from the inner surface thereof and said spring also being adapted to contract in diameter and increase correspondingly in length upon passing through a constricted place in said pipeline.

2. A scraper for a pipe comprising, in combination, a plurality of resilient deformable balls secured together in series by a flexible shaft passing diametrically through said balls, said balls being secured with the surfaces of at least two of said balls touching each other, securing means at each end of said shaft to retain the balls thereon, and a longitudinally deformable helical spring secured at one end to one of said securing means and having its other end free, the diameter of said two touching balls and at least a portion of the length of said helical spring having a diameter substantially the same as the internal diameter of said pipe, whereby said pipe scraper is adapted to be forced through said pipe by fluid under pressure on said balls, and said two touching balls being adapted to deform as needed to pass any incidental restrictions that may be in said pipe and bridge over any incidental enlargements therein without being bypassed by any substantial amount of said fluid, and the free end of said helical spring being adapted to drag behind said balls along the internal surface of said pipe thereby scraping same, and stretch and thereby reduce in diameter to pass said incidental restrictions.

References Cited in the file of this patent

UNITED STATES PATENTS

| | | |
|---|---|---|
| 63,695 | Blake et al. | Apr. 9, 1867 |
| 238,005 | Shepard | Feb. 22, 1881 |
| 646,545 | Novotny | Apr. 3, 1900 |
| 1,218,005 | Schlemmer | Mar. 6, 1917 |
| 1,280,443 | Griffin | Oct. 1, 1918 |
| 2,114,236 | Pellette | Apr. 12, 1938 |
| 2,341,435 | Galea | Feb. 8, 1944 |
| 2,640,213 | Robinson | June 2, 1953 |
| 2,685,685 | Lathrop et al. | Aug. 3, 1954 |
| 2,690,808 | Besse | Oct. 5, 1954 |

FOREIGN PATENTS

| | | |
|---|---|---|
| 547,897 | Germany | Apr. 14, 1932 |
| 594,136 | Germany | Mar. 12, 1934 |